United States Patent [19]

Townsend et al.

[11] Patent Number: 5,155,917
[45] Date of Patent: Oct. 20, 1992

[54] POCKET SIZED TELESCOPING LEVEL APPARATUS

[75] Inventors: Jackson Townsend; Nancy G. Townsend, both of Metairie; Ronald M. O'Connor, Jefferson, all of La.

[73] Assignee: Nursing Knowledge, Inc., Metairie, La.

[21] Appl. No.: 698,405

[22] Filed: May 10, 1991

[51] Int. Cl.$^5$ .............................................. G01B 3/08
[52] U.S. Cl. ........................................ 33/374; 33/809
[58] Field of Search ............... 33/809, 374, 375, 451, 33/296, 354; 285/298, 301, 165; 403/109

[56] References Cited

U.S. PATENT DOCUMENTS

| | | | |
|---|---|---|---|
| 1,221,723 | 4/1917 | Guichard | 403/109 X |
| 2,265,794 | 12/1941 | Aske | 403/109 X |
| 3,492,737 | 2/1970 | Swanson | 33/809 |
| 3,762,058 | 10/1973 | Heater | 33/809 |

FOREIGN PATENT DOCUMENTS

| | | | |
|---|---|---|---|
| 0336837 | 10/1989 | European Pat. Off. | 403/109 |
| 673551 | 10/1929 | France | 33/809 |
| 1477537 | 3/1967 | France | 33/809 |
| 2086049 | 5/1982 | United Kingdom | 33/809 |

Primary Examiner—Harry N. Haroian
Attorney, Agent, or Firm—Pravel, Gambrell, Hewitt, Kimball & Krieger

[57] ABSTRACT

A pocket sized telescopic level apparatus includes a plurality of at least three telescoping tubular sections including a largest section and sequentially smaller sections, each section having an exterior diameter and a longitudinal bore with an interior diameter, and wherein the sections are of sequentially larger external diameter so that one section fits into an adjacent section and all sections are contained upon the largest section in a collapsed position. A level bubble member is disposed at an end portion of the largest section and a plurality of shims form interfaces between the end portions of adjacent sections upon extension of the apparatus. The shims are tubularly shaped and positioned between the outer wall of an end portion of one section and the inner wall of an adjacent section.

20 Claims, 3 Drawing Sheets

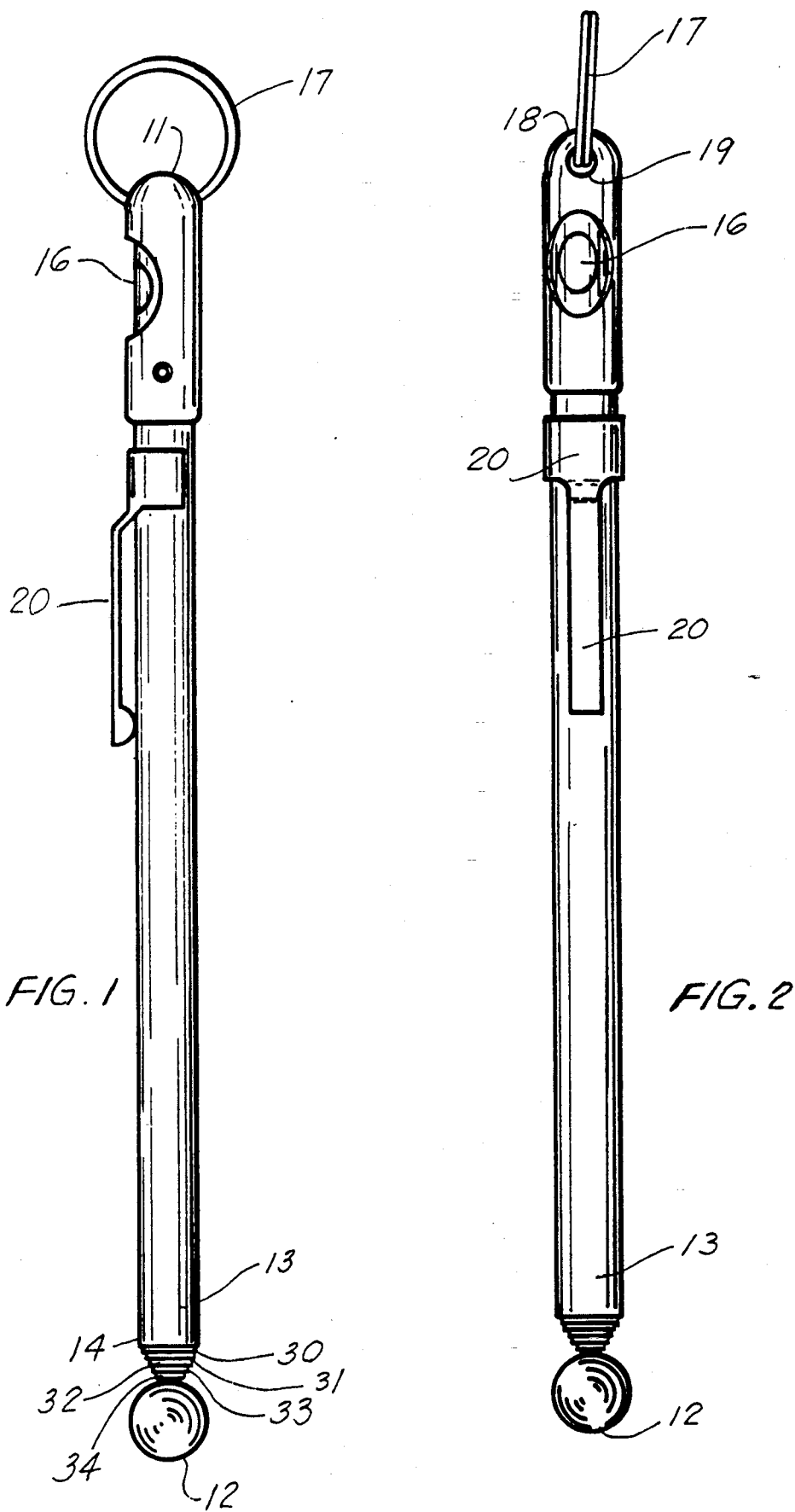

POCKET SIZED TELESCOPING LEVEL APPARATUS

FIELD OF THE INVENTION

1. Field Of The Invention

The present invention relates to extendable levels and more particularly relates to a pocket sized extendable level that includes multiple telescoping sections that are extendable and wherein the entire level apparatus can fit within the pocket of a user, being on the order of six to eight (6-8) inches in length.

2. General Background

A number of level constructions have been patented which relate to extensions of levels. As seen in levels referenced by the below discussed U.S. Pat. Nos. 4,862,595; 4,607,437; 4,130,943; 3,648,378; 3,104,477; 2,879,606 and 3,161,964, these levels usually involve the use of two sleeve like extensions Which collapse over a center or core unit and are designed to varying length, typically being heavy duty levels used in construction trades.

The amount of extension afforded these heavy levels ranges anywhere from two to eight (2-8) feet for example. The various extension lengths are either predetermined and to fixed positions increments or involve some type of locking mechanism to hold the extension pieces in place.

Levels generally provide for an extension capacity which is limited to about double the length of the level when it is collapsed. These above mentioned levels are typically designed to be employed as surface truing tools in such applications as door hanging, door frame alignment, elevator rail bracket positioning and the like.

U.S. Pat. No. 2,551,524 employs only one extension sleeve but it is otherwise similar to the above discussed patents. Another level is shown in U.S. Pat. No. 3,277,579 which is actually telescopic in design and capable of aligning points in space (as opposed to leveling of surfaces), but it too is designed to be large and heavy for use in the construction trades, intended to extend about six to eight (6-8) feet between ceilings and floors. This apparatus is quite large even when completely collapsed, and specifically involves the use of positioning bolts. Its spring mechanism requires the application of pressure at both ends.

A carpenter's level is shown in U.S. Pat. No. 2,879,606 issued to J. J. Olivere. The device employs level bubbles and has a pair of elongated tubular sleeve elements telescopically mounted over opposite ends of a central member, the ends meet each other approximately at the center of the central member.

In U.S. Pat. No. 3,104,477 entitled "Level" issued to B. J. Edwill provides a pair of level members that extend with respect to each other upon two cylindrical rails. In one embodiment, the extendable members move away from a central level portion.

In the Miles U.S. Pat. No. 3,161,964 entitled "Elevator Rail Bracket Positioning Device", three sections of a telescoping level are shown including a smaller central section and a pair of larger side sections.

In the Thingstad U.S. Pat. No. 3,648,378 entitled "Arrangements in an Extensible Air Bubble Type Level", there is provided a pair of side mounted extensible parts which move away from a center level.

In the Moore U.S. Pat. No. 3,811,197, a center smaller level portion is provided with a pair of larger extensible sleeves that mount thereon in telescoping fashion and extend so as to expand the overall length of the level.

A vertical telescoping level is the subject of the Murphy U.S. Pat. No. 3,277,579. The apparatus includes an inner tube and an outer tube with a leveling assembly carried by the larger tube.

The Talbot U.S. Pat. No. 4,103,943 entitled "Extension Level" provides a carpenter's level extendable preferably from the length of 24 to the length of 48 inches in six inch increments. The level includes an I-Beam shaped bay section with right and left extension members slidably mounted thereon. The extension members engage either side of the base at tracks formed by the side extensions of the eye.

Another patent that relates to a center level member with extensible side members is the McSorley U.S. Pat. No. 4,607,437.

A small level that can be carried in the pocket of the user is seen in the Rohlinger patent entitled "Level and Collapsible Ruler". The '764 patent provides a combination collapsible ruler and level, and includes a pre-stress coilable and uncoilable spring strip ruler with a level tube mounting block mounted intermediate the strip ends. The mounting block has a foot portion which engages the supporting surface to make the spring strip self-supporting on a surface with the level tube in the proper plane. When collapsed, the spring strip forms two coils which abut adjacent the level mounting block to provide for convenient handling.

SUMMARY OF THE PRESENT INVENTION

The present invention provides a pocket level that is designed to assist in the true alignment of points in space. It is intended for instance to be used in nursing so as to correctly align the phlebostatic axis of a patient (located at the fourth ICS at the mid-axillary line), otherwise known as the level of the mitral valve, with the zero reference point or stop cock of a strain gauge transducer that is connected to an invasive hemodynamic monitoring line.

With this alignment, hydrostatic effects of position change and head rest position elevation are eliminated and pressures recorded are considered true intravascular readings. Pressure lines requiring this technique as the standard of measurement are: left atrial, left ventricular, pulmonary artery, right atrial, central venous, pulmonary artery occlusive pressures, right ventricular pressures and systemic arterial pressures.

The apparatus of the present invention may be used to align the ventricle of the brain with a strain gauge transducer for the purpose of intracranial pressure monitoring and for intraventricular drains where CSF is drained into a closed bag. The level of this bag in relationship to the patient's ventricle dictates the amount of fluid removed per physician's order.

It is an object of the present invention to provide a small and lightweight level so as to be pocket size and easily portable, preferably being capable of clipping or attaching to a shirt pocket or jacket pocket. It is an object of the present invention to provide a level that can be easily calibrated.

It is another object of the present invention to provide infinite adjustability throughout its extension range and without complex lock-down mechanisms.

It is an object of the present invention to provide a pocket size level that preferably has a minimum of four hundred percent (400%) increase in its fully extended position over its collapsed configuration and with a maximum length of for example thirty-four (34) inches and with a minimum length of about 8 inches. These lengths are compatible with pocket size requirements and the nursing applications described above.

It is an object of the present invention to provide an improved pocket level construction that is capable of being extended and retracted between or through openings in object existing between two points requiring alignment such as for example bed rails in the nursing application described above.

It is an object of the present invention to provide a pocket level apparatus of improved construction that provides tight tolerances so as to insure accurate readings over extended periods of use.

The preferred construction of the present invention is to provide a pocket level having circular or square sections wherein the sections overlap approximately one and one half to two (1½-2) inches and wherein curved shims are used to eliminate play between adjacent sections.

The present invention thus provides a pocket size telescoping level apparatus that includes a plurality of at least three telescoping tubular sections including a largest section and sequentially smaller sections, each section having an exterior diameter and a longitudinal bore with an interior diameter and wherein the sections are sequentially larger external diameters so that one section fits into an adjacent section and all of the sections are contained within the largest section when the level is folded into a fully collapsed position. A level bubble member is disposed at one end portion of the largest section and a plurality of tubular shims form an interface between the end portions of adjacent sections, the shims being positioned between the outer wall of an end of one section and the inner wall of the adjacent section.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein:

FIG. 1 is a side view of the preferred embodiment of the apparatus of the present invention;

FIG. 2 is a front view of the preferred embodiment of the apparatus of the present invention;

DETAILED DESCRIPTION OF THE PREFERRED EMBODIMENT

FIGS. 1, 2 and 5-6 illustrate the preferred embodiment of the apparatus of the present invention designated generally by the numeral 10. Pocket level 10 includes a pocket sized tubular structure that includes an upper end portion 11 and a lower end portion 12. The end portion 12 can be in the form of a sphere having an outer diameter substantially equal to the outer diameter of upper end portion 11.

Figure 3:
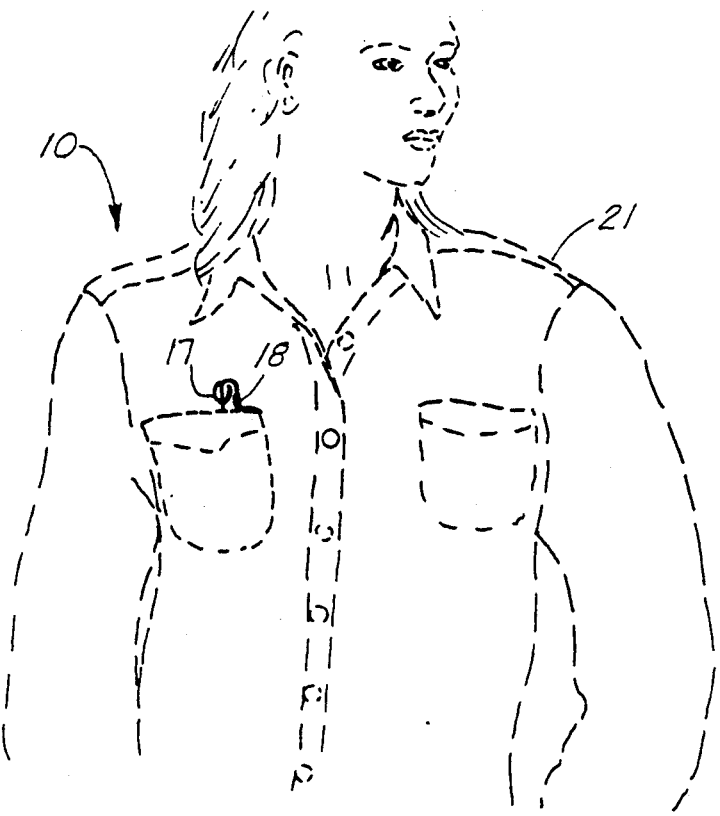
FIG. 3 is a schematic view illustrating the storage of the apparatus of the present invention in the pocket of a user.
Figure 4:
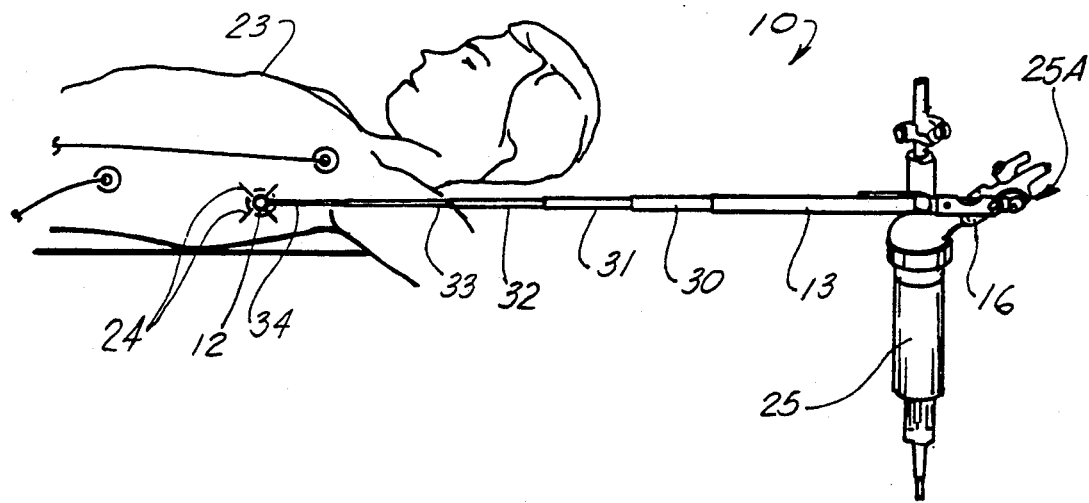
FIG. 4 is a schematic view of the preferred embodiment of the apparatus of the present invention illustrating its use with a patient.
Figure 5:
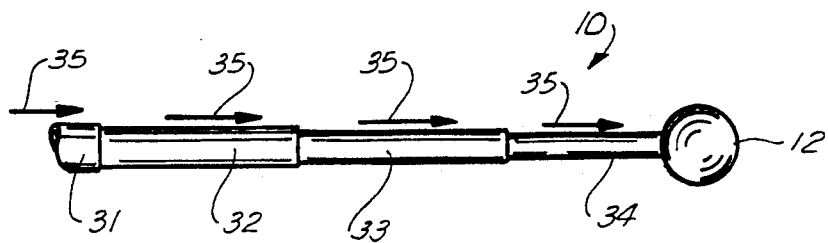
FIG. 5 is a side fragmentary view of the preferred embodiment of the apparatus of the present invention.

The largest tubular section 13 provides an open end portion 14 and a closed end portion 15. Level bubble assembly 16 is carried at end portion 15 of large section 13 as shown in FIGS. 1 and 2. A ring 17 attaches to end portion 18 of level bubble 16 at opening 19. Clip 20 can be used for affixing level apparatus 10 to the pocket of a user as shown in FIG. 3, the user being designated as 21 in phantom lines and the pocket of the user in phantom lines by the numeral 22. In FIG. 4, use of level 10 with a patient 23 is shown with the level 10 being used to level the stopcock 25a on transducer 25 to the phlebostatic axis 24 on a patient 23.

Figure 6:
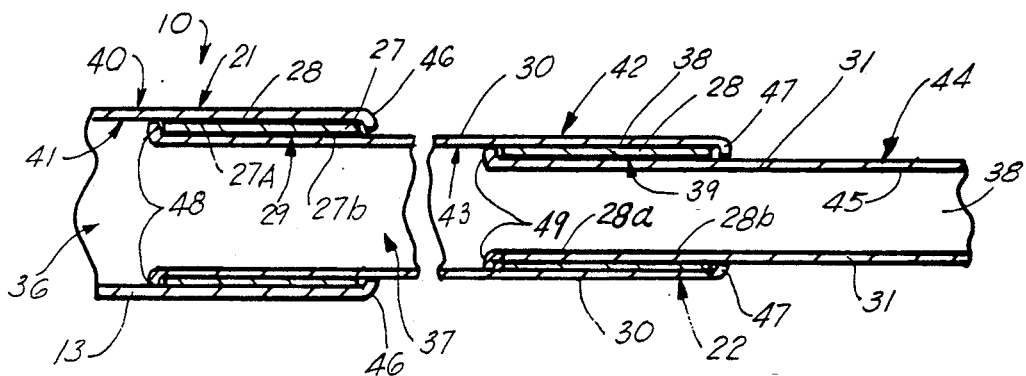
FIG. 6 is a side sectional view of the preferred embodiment of the apparatus of the present invention.

A plurality of tubular sections 30-34 are contained within larger tubular section 13 as shown in FIGS. 1-2 and 5-6. The smallest tubular section 34 is attached to sphere 12. During extension, each section 30-34 moves in a direction as shown by the arrows 35 when extending level 10. If FIG. 6, a partial sectional side view is shown illustrating the largest section 13, the next smallest section 30 and the next sequentially smaller section 31. It should be understood, however that the joint shown in FIG. 6 between tubular sections 13 and 30 and the joint between sections 30 and 31 is a joint construction that is repeated at the interface between sections 31-32; 32-33; and 33-34. In FIG. 6, only two joints (between sections 13-30 and 30-31) are shown for purposes of illustration.

The tubular sections 13 and 30-35 are hollow, each providing a bore which is hollow and cylindrical as shown in FIG. 6. Bore 36 defines the hollow interior of largest cylindrical section 13 and bore 37 defines the cylindrical hollow interior of section 30 while bore 38 defines the hollow cylindrical section of the section 31.

Figure 7:
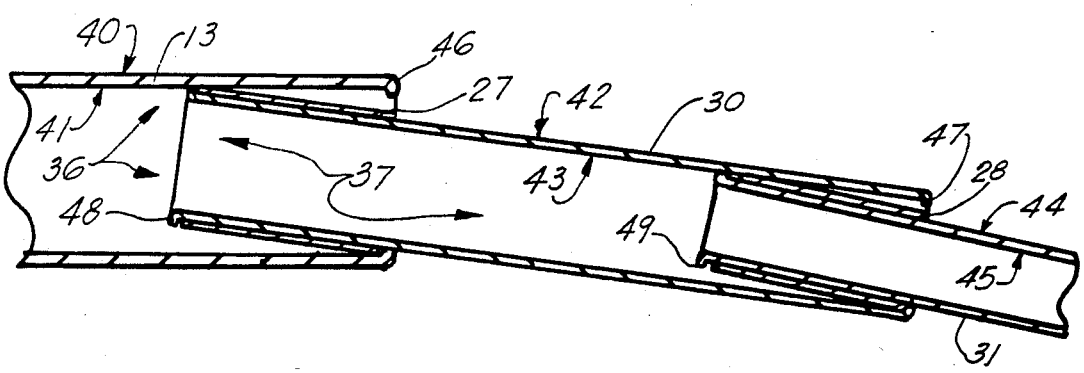
FIG. 7 is a fragmentary sectional view illustrating deflection between adjacent tubular sections.

In FIG. 6 and 7, an enlarged sectional view is shown of the apparatus 10 in a straight, elongated position. In FIG. 7, an exaggerated scale view is illustrated to show the deflection that occurs if the apparatus is subjected to the stress of its own weight such as when supported at its end portion 15 and in a fully extended position. It should be understood however that the scale of FIG. 7 is greatly exaggerated for purposes of illustration. FIG. 7 is used to illustrate that the shims 27, 28 lessen the deflection when the apparatus 10 is fully extended than would otherwise occur without the presence of the shims 27, 28.

In FIG. 6, a pair of joints, 21, 22 are shown, the joint 21 defining an interface between the enlarged section 13 and the tubular section 30. The joint 22 illustrates the interface between the joint 30 and the joint 31. Cylindrical shims 26, 27 are shown as interfacing between the tubular sections 13-30 and 30-31 respectively. The use of the curved shims 26, 27 defines an interface that is formed between the outer surface 28 of shim 26 and the inner surface 29 of shim 27 with outer surface 42 of tubular section 30.

The joint 22 shows an interface defined by the shim 28 and more particularly the outer surface 38 of shim 27 and the inner surface 39 which abuts the outer surface 44 of tubular section 31, the inner surface 45 being also illustrated. That surface 45 would form a connection with the next shim (not shown). The largest section 13 provides an outer surface 40 which is the external surface of the apparatus upon collapse as shown in FIGS. 1 and 2. The inner surface 41 of tubular section 13 registers with the outer surface 28 of shim 27 as shown in FIG. 6. Each section 13 and 30-33 provides annular crimped end portions in the form of annular shoulders 46-49 (FIGS. 6 and 7).

Upon extension of the apparatus 10, each of the annular shoulders 46-49 functions as a stop against a shim as seen in FIGS. 6 and 7. For example, extension movement of the section 30 is stopped with respect to sections 13 and 31 because shoulders 46 and 48 abut shim 27 and shoulders 47-49 abut shim 28. Each section 32, 33, has a joint 21, 22 such as is shown in FIG. 6 using such shims and annular shoulders.

For purposes of illustration, FIG. 7 shows that the shims 27 and 28 provide a diameter that extends preferably one to one and one half (1-1½) inches in length to minimize deflection. In FIG. 7, an over-exaggerated scale is provided to show that some deflection might occur, but the shims minimize the deflection thus providing accuracy even when the apparatus is fully extended such as for example thirty-eight to forty (38-40) inches which can be four times the collapsed length of the apparatus 10 of for example six to eight (6-8) inches. The use of the shims 27-28 as shown in FIGS. 6 and 7 helps minimize deflection between the end portions 15-12 of the apparatus 10 even when fully or partially extended, the position shown in FIG. 4. The shims 27, 28 could be in two parts, 27a-27b and 28a-28b. The part 27a would be attached to and travel with the end of section 30 on the outer surface thereof. The shim part 27b would be attached to and travel with the end of section 13, attached to the inside surface 41 thereof. This use of split shims 27a-27b (and similarly 28a-28b) affords better support at intermediate extension positions, such as half extended.

An exemplary embodiment provides an extendable pocket size level that extends to about thirty four inches (34") and collapses to about seven to eight inches (7-8"). The sections 30-34 are each about six inches (6") in length. The largest section 13 which includes level bubble assembly 16 is about eight inches (8") in length. Total diametrical clearance (i.e., the clearance between the outer diameter of a curved shim 26, 27 and the inner diameter of a section bore 36, 37) is about 0.25 mm or less, giving very small overall deflection during use and when fully extended, and less than one quarter inch (¼") deflection for thirty four inches (34") of length. This provides a preferred ratio between section length (of about six inches (6") or one hundred fifty to one hundred sixty millimeters (150-160 mm) and overall diametrical clearance of greater than five hundred or about six hundred fifty to one (650:1) in the above example. Each shim 26, 27 is about one fifth to one quarter of the adjacent section 13, 30-34 length.

The following table 1 shows the parts including number and description as used herein and in the accompanying drawings:

TABLE 1

| PART NO. | DESCRIPTION |
|---|---|
| 10 | level apparatus |
| 11 | upper end |
| 12 | lower end |
| 13 | largest tubular section |
| 14 | open end portion |
| 15 | closed end portion |
| 16 | level bubble assembly |
| 17 | ring |
| 18 | end portion of level bubble |
| 19 | opening |
| 20 | clip |
| 21 | joint |
| 22 | joint |

TABLE 1-continued

| PART NO. | DESCRIPTION |
|---|---|
| 23 | patient |
| 24 | phlebostatic axis |
| 25 | transducer |
| 25a | stopcock |
| 26 | curved shim |
| 27 | curved shim |
| 27a | shim |
| 28 | outer surface |
| 29 | inner surface |
| 30 | tubular section |
| 31 | tubular section |
| 32 | tubular section |
| 33 | tubular section |
| 34 | smallest tubular section |
| 35 | arrows |
| 36 | bore |
| 37 | bore |
| 38 | outer surface |
| 39 | inner surface |
| 40 | outside surface |
| 41 | bore inner wall |
| 42 | outer surface |
| 43 | inner surface |
| 44 | outer surface |
| 45 | inner surface |
| 46 | annular shoulder |
| 47 | annular shoulder |
| 48 | annular shoulder |
| 49 | annular shoulder |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A pocket size telescoping level apparatus comprising:

a) a plurality of at least three telescoping tubular sections including a largest section with a proximal free end and sequentially smaller sections, each section having an exterior diameter and a longitudinal bore with an interior diameter and wherein the sections are of sequentially larger external diameters so that one section fits into an adjacent section and all sections are contained within the largest section, the telescoping sections being collapsible to a collapsed position within the largest section and extendable to an extended position and the tubular sections having a common central longitudinal axis;

b) a tubular level bubble assembly extending axially from the free end portion of the largest section and having a level bubble assembly central longitudinal axis aligned with the longitudinal axis of the tubular sections;

c) a plurality of longitudinally extending tubular shims, forming an interface between the end portions of adjacent sections and additional rigidity to the tubular sections in both collapsed and extended positions, the shims being positioned between the outer wall of an end of one section and the inner wall of the adjacent section;

d) each shim having first and second annular end portions that each closely conform to the outer wall of one section and the inner wall of the adjacent section, and each shim having a length that is greater than the diameter of the said adjacent section; and e) each telescoping section carrying a stop at its end portion that contacts shim so that the shims and stops define the extension limit of the plurality of tubular sections in the extended position.

2. The apparatus of claim 1 wherein the shim contained within each section has a length equal to at least twenty percent of the length of the section that contains the shim.

3. The apparatus of claim 1 wherein the sections are generally rounded in transverse cross section.

4. The apparatus of claim 1 wherein there is a smallest section having a distal end with an element affixed thereto, and the element is of a diameter that approximates the diameter of the proximal end.

5. The apparatus of claim 4 wherein the element is rounded, having a shape with a transverse cross section that is equal to the cross section of the proximal end.

6. The apparatus of claim 5 wherein each shim extends longitudinally a distance of at least 1.5 inches.

7. The apparatus of claim 1 wherein the level bubble is attached to a closed end of the largest section.

8. The apparatus of claim 1 wherein each section has a section length to clearance ratio of at least 500 to 1.

9. The apparatus of claim 1 wherein a plurality of the sections have cylindrically shaped internal bores, and the shims have cylindrically shaped outer surfaces.

10. A pocket size telescoping level apparatus comprising:
   a) a plurality of at least four telescoping cylindrical sections including a largest proximal end cylindrical section and sequentially smaller cylindrical sections, each section having an exterior diameter and a longitudinal bore with an interior diameter and wherein the sections are of sequentially larger external diameters so that one section fits into an adjacent section and all sections are contained within the largest section;
   b) a level bubble assembly disposed at one end portion of the largest cylindrical section;
   c) a plurality of cylindrical shims having generally cylindrical inner and outer surfaces, a pair of said shims forming an interface between the end portions of adjacent sections, each pair of the shims being tubularly shaped and positioned between the outer wall of an end of one section and the inner wall of the adjacent section with one of each said pair of shims being attached to one section and the other being attached to said other adjacent section and the pair of shims thereby being separable from each other during use into spaced apart positions, so that in an extended position, a said pair of spaced apart shims supports an adjoining pair of sections;
   d) the shims defining stops for limiting extension of the tubular sections; and
   e) each shim having an internal cylindrical bore and spaced apart annular end portions thereof that closely fit upon the outer surface of a tubular section, and an outer cylindrical surface with spaced apart annular end portions thereof that closely fit upon the inner surface of a tubular section.

11. The apparatus of claim 10 wherein the sections extend to an extended length that is about four times the length of the largest section.

12. The apparatus of claim 10 wherein the sections are cylindrical in transverse cross section.

13. The apparatus of claim 10 wherein there is a smallest section having a distal end with an element affixed thereto, and the element is of a diameter that approximates the diameter of the proximal end.

14. The apparatus of claim 13 wherein the element is rounded, having a shape with a transverse cross section that is equal to the cross section of the proximal end.

15. The apparatus of claim 14 wherein each shim extends longitudinally a distance of at least 1.5 inches.

16. The apparatus of claim 10 where the level bubble assembly is attached to a closed end of the largest section.

17. The apparatus of claim 10 wherein each section has a section length to clearance ratio of at least 500 to 1.

18. The apparatus of claim 10 wherein a plurality of the sections have cylindrically shaped internal bores, and the shims have cylindrically shaped outer surfaces.

19. The apparatus of claim 10 wherein the shim contained within each section has a length equal to at least twenty percent of the length of the section that contains the shim.

20. The apparatus of claim 19 wherein the maximum diametrical clearance between each section and the adjacent shim is less than 0.25 mm.

* * * * *

UNITED STATES PATENT AND TRADEMARK OFFICE
CERTIFICATE OF CORRECTION

PATENT NO. : 5,155,917

DATED : October 20, 1992

INVENTOR(S) : Jackson Townsend, Nancy G. Townsend, Ronald M. O'Connor, Christopher G. Greve It is certified that error appears in the above-identified patent and that said Letters Patent is hereby corrected as shown below:

On the title page: Item [75 add
--Christopher G. Greve-- after "Jefferson".

Signed and Sealed this

Fifth Day of October, 1993

*Attest:*

BRUCE LEHMAN

*Attesting Officer*  *Commissioner of Patents and Trademarks*